United States Patent
Rompel et al.

(10) Patent No.: US 11,904,424 B2
(45) Date of Patent: Feb. 20, 2024

(54) DUST EXTRACTOR WITH FLAT BACK

(71) Applicant: Black & Decker Inc., New Britain, CT (US)

(72) Inventors: Markus Rompel, Runkel (DE); Ian S. Bell, Sunninghill (GB); Uwe Nemetz, Canton (DE)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 15/709,584

(22) Filed: Sep. 20, 2017

(65) Prior Publication Data

US 2018/0085873 A1 Mar. 29, 2018

(30) Foreign Application Priority Data

Sep. 27, 2016 (GB) .................................... 1616363

(51) Int. Cl.
*B23Q 11/00* (2006.01)
*B28D 7/02* (2006.01)

(52) U.S. Cl.
CPC ...... *B23Q 11/0046* (2013.01); *B23Q 11/0071* (2013.01); *B23Q 11/005* (2013.01); *B28D 7/02* (2013.01)

(58) Field of Classification Search
CPC .............. B23Q 11/0046; B23Q 11/005; B23Q 11/0071; B23Q 11/006; B23D 59/006; B28D 7/02
See application file for complete search history.

(56) References Cited

U.S. PATENT DOCUMENTS

| | | | |
|---|---|---|---|
| 11,123,855 B2 * | 9/2021 | Hartmann | B25D 17/26 |
| 11,510,534 B2 * | 11/2022 | Lauer | B25F 5/02 |
| 11,627,863 B2 * | 4/2023 | Nemetz | B23Q 11/0046 15/257.1 |
| 2002/0141836 A1 * | 10/2002 | Ege | B23Q 11/0046 408/67 |

(Continued)

FOREIGN PATENT DOCUMENTS

| | | | | |
|---|---|---|---|---|
| CN | 102990617 A | * | 3/2013 | ......... B23Q 11/0046 |
| EP | 2554327 | | 2/2013 | |

(Continued)

OTHER PUBLICATIONS

Extended EP search report dated May 15, 2018 issued in corresponding EP Application No. 17192556.3.

*Primary Examiner* — Eric A. Gates
(74) *Attorney, Agent, or Firm* — Rhonda Barton

(57) ABSTRACT

A dust extractor for a drill is provided, including a single air flow path, a shroud having an internal chamber for collecting dust in fluid communication with a first end of the single air flow path, a filter assembly located in the single air flow path, a vacuum source connected to a second end of the single air flow path, and an air flow control mechanism controlling a direction of air flow generated by the vacuum source. During a normal operation, the vacuum source draws air and entrained debris from the internal chamber of the shroud through the single air flow path. During a back flush operation, the vacuum source blows air and entrained debris through the single air flow path towards the shroud. The air passes through the filter assembly to remove the entrained debris in either direction.

9 Claims, 11 Drawing Sheets

(56) References Cited

U.S. PATENT DOCUMENTS

2004/0208715 A1* 10/2004 Arich .................. B25F 5/02
408/67
2005/0281627 A1* 12/2005 Britz ................ B23Q 11/0046
408/67
2011/0308830 A1* 12/2011 Furusawa .......... B23Q 11/0046
173/198

FOREIGN PATENT DOCUMENTS

EP           3009058      4/2016
WO     WO-0056499 A1 * 9/2000   ......... B23Q 11/0046

* cited by examiner

DUST EXTRACTOR WITH FLAT BACK

RELATED APPLICATION

This application claims priority from Great Britain Application No. GB1616363.6 filed Sep. 27, 2016, which is incorporated herein by reference in its entirety.

FIELD

The present invention relates to a dust extractor for a power tool, and in particular, to a dust extractor which can clean its filter using flush back.

BACKGROUND

One type of power tool drill is a hammer drill which typically comprises an electric motor, a hammer mechanism and/or a rotary drive. The hammer drill is powered ether by an AC mains electric power supply or a battery attached to the hammer drill. A cutting tool, such as a drill bit, is supported within a tool holder mounted on the front of the hammer drill which is driven by the motor via either the rotary drive or the hammer mechanism or both to perform cutting operations. Such a hammer drill usually can operate in a hammer only mode, a drill only mode or a hammer and drill mode.

EP1157788 describes a typical example of hammer drill.

During the operation of a hammer drill, a large amount of dust can be generated. In addition to making the local vicinity dirty and clogging up the hammer drill, it can also be a health hazard to the operator of the hammer drill as the operator may breathe in the dust. As such it is desirable to collect the dust so that it can be safely disposed of.

One method of achieving this is to use a dust extractor which mounts onto the hammer drill. EP1245330 shows an example of a dust extractor. Another way is attach an industrial vacuum cleaner to either a dust extraction chute formed on the drill or an attachment mounted on the drill. EP1495706 shows an example of an industrial vacuum cleaner and EP2335869 shows such an attachment.

Dust extractors are attached to the body of a hammer drill. The dust extractor comprises a main body and a shroud, typically mounted on the end of a tubular telescopic arm which is attached to the main body, and which surrounds the cutting tool and engages with the work piece being cut. The dust extractor comprises a dust collection box, a filter mounted within the dust collection box and an air suction device. Whilst the hammer drill is in use, the air suction device is switched on. During use, the dust generated by the cutting tool cutting the work piece enters the shroud. The air suction device draws the air together with dust from within shroud, through the telescopic arm into the dust collection box. The air passes then through the filter, whilst the dust is trapped by the filter within the dust collection box. The clean air is then typically expelled from the dust extractor. Once the operation of the hammer is complete, the dust extraction box can be removed from the dust extractor and the dust removed from the dust collection box and safely disposed of.

In some designs dust extractors, the air suction device can be located remotely from the body. In one example, the dust extractor could be attached to an industrial vacuum cleaner, the industrial vacuum cleaner forming the air suction device. In another example, the cooling fan of the electric motor of the hammer drill can be used as the air suction device and generate an air vacuum source which connects to the main body of the dust extractor. The air is drawn through the filter, out of the main body of the dust extractor and then into the housing of the hammer drill where it passes through the cooling fan of the hammer drill.

In alternative designs, a fan is rotatable mounted within the main body of the dust extractor adjacent the filter. The fan is rotatably driven by a motor to generate an air vacuum source and draw air from the shroud into the dust collection box and then through the filter before expelling it from the main housing. The fan can be rotatably driven by an electric motor mounted within the main housing of the dust extractor. EP1459842 discloses such a dust extractor. Alternatively, the fan can be releasably attached to the spindle of the drive motor of the hammer drill. DE4024022 discloses such a dust extractor.

One problem with existing exiting designs of dust extractors is that the filter becomes blocked. As such, the filter needs to be cleaned which is typically done manually. Therefore, access to the filter has to be provided or the filter has to be made to be removeable so that it can be manually cleaned. However, it is desirable if the cleaning process could be made to occur automatically during its operation, thus reducing the frequency with which the filter has to be accessed.

Industrial vacuums cleaners used with power tools, including hammer drills, are large devices which are typically located on the floor, usually on castor wheels, and which connect to a power tool or n attachment via a hose. Industrial vacuum cleaners have an automatic cleaning system referred to as flush back. EP1646441 describes an example of an industrial vacuum cleaner which uses flush back. This allows the filters of the industrial vacuums to be cleaned whilst the vacuum cleaner is in operation. However, industrial vacuums which utilise flush back have a minimum of two separate filters which operate in parallel in the air flow. The purpose of having at least two filter is that whilst one of the filter is undergoing flush back, the other filters continue to function normally. During normal operation, the dirty air is drawn through all of the filters at the same time, the dust being blocked from passing through the each of the filters. When flush back occurs, the down side of one of the filters is disconnected from the suction mechanism (typically a rotating fan) and is then connected to ambient air surrounding vacuum cleaner. As such, air is drawn in the reverse direction through the filter undergoing flush back and then through the other filters in normal direction. The reverse flow of air through the filter undergoing flush back blows off any dust trapped in the filter undergoing flush back, thus cleaning the filter. All of the filters in the industrial vacuum cleaner are cleaned using flush back in a sequential manner, the other filter operating normally as the each filter is cleaned.

Such a technique could be transferred from an industrial vacuum cleaner to a dust extractor if the dust extractor comprised at least two filters working in parallel air flows which can be isolated. However, dust extractors typically have a single filter or a number of filters which are located in series in a single air flow. As such, the down side of the filter cannot simply be connected to ambient air surrounding the dust extractor as there would be no suction force.

SUMMARY

The present invention provides a solution by directing the air flow generated by the fan directly back through the filter in the reverse direction.

Accordingly, in an embodiment, a dust extractor for a drill is provided, including a single air flow path, a shroud having an internal chamber for dust in fluid communication with a first end of the single air flow path, a filter assembly located in the single air flow path, a vacuum source connected to a second end of the single air flow path, and an air flow control mechanism controlling a direction of air flow generated by the vacuum source. During a normal operation, the vacuum source draws air and entrained debris from the internal chamber of the shroud through the single air flow path. During a back flush operation, the vacuum source blows air and entrained debris through the single air flow path towards the shroud. The air passes through the filter assembly to remove the entrained debris in either direction.

BRIEF DESCRIPTION

Seven embodiments of the present invention will now be described with reference to the accompanying drawings of which:

DETAILED DESCRIPTION

Figure 1:
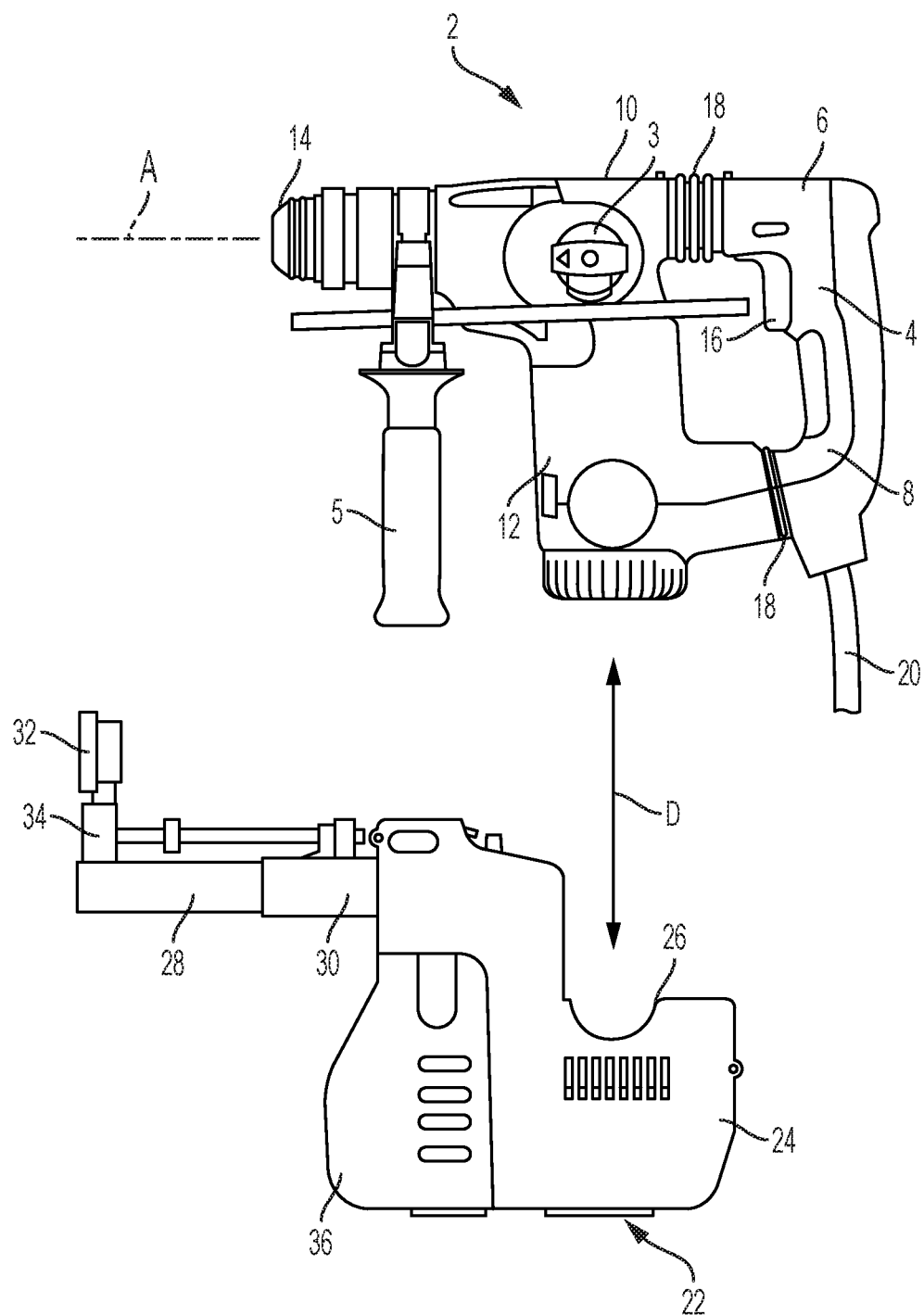
FIG. 1 shows a side view of a known design of hammer drill and known design of dust extractor.

Referring to FIG. 1, a hammer drill comprises a main housing 2 and a rear handle 4 attached to the main housing 2 via vibration dampeners 18 at its upper 6 and lower 8 ends. The main housing 2 comprises a motor housing 12, in which is mounted an electric motor (not shown), and a transmission housing 10, in which is mounted the hammer mechanism (not shown) and rotary drive (not shown). A mode change knob 3 is used to change the mode of operation of the hammer drill. A tool holder 14 is mounted on the front of the transmission housing 10 which is capably of releasably holding a cutting tool (not shown). The tool holder is cable of being rotated about axis A. A front handle 5 is attached to the transmission housing 10 behind the tool holder 14. A trigger switch 16 is mounted within the rear handle 4 by which an operator can activate the hammer drill. An electric cable 20 connects to the base of the rear handle 4 by which a mains AC electric power supply is supplied to the hammer drill.

A typical dust extractor comprises a main housing 22 manufactured from two plastic clam shells 24, 26 which are joined together about a vertical plane using screws. Mounted on the top of the main housing 22 is a telescopic tubular extension arm 28, 30. A first section 28 of the telescopic arm 30 can slide in and out of the other second section 30. A spring 100 biases the first section 28 out of the second section 30 towards its maximum extended position.

Mounted on the end of the first section 28 remote from the main housing is a tubular support 34 and a shroud 32. A hole is formed through the shroud 32 to allow a cutting tool to pass through the shroud 32.

A dust collection box 36 releaseably connects to the front of the main housing 22. A filter 102 is releasably connected to the main housing inside of the box 36.

When attaching the dust extractor to the hammer drill, the dust extractor is slid in the direction of Arrow D onto the motor housing until a latch (not shown) reliably attaches the dust extractor to the motor housing 12. When the dust extractor is mounted on the hammer drill, an electrical connection is made between the dust extractor and the hammer so that electrical power and signals can be transmitted from the hammer drill to the dust extractor.

An embodiment of the present invention will now be described with reference to FIGS. 2 and 3. Where the same features are present in the embodiment are present in the example described with reference to FIG. 1, the same reference numbers have been used.

Figure 2:
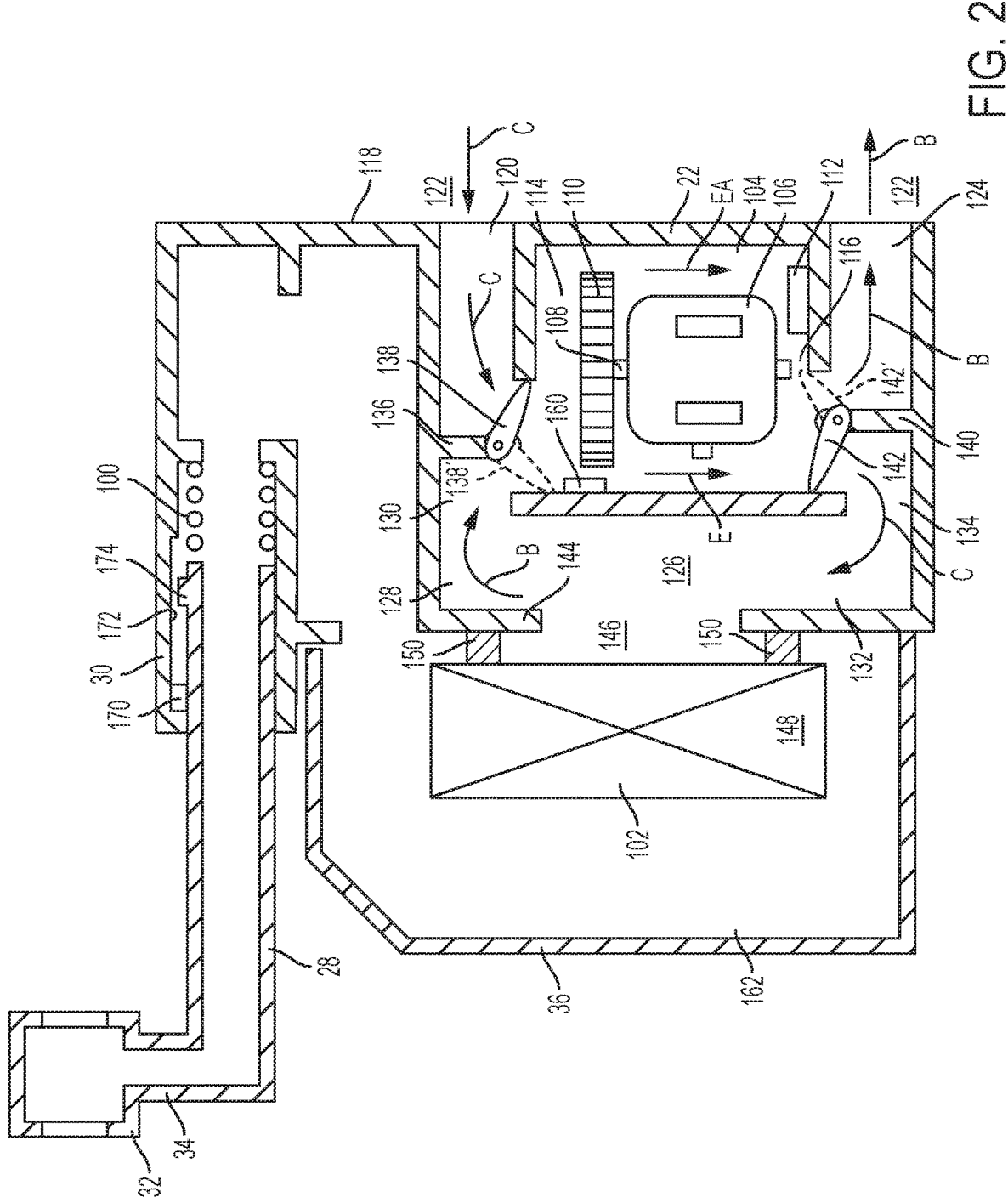
FIG. 2 shows a schematic diagram of a cross section of a dust extractor according to a first embodiment of the present invention.
Figure 3:
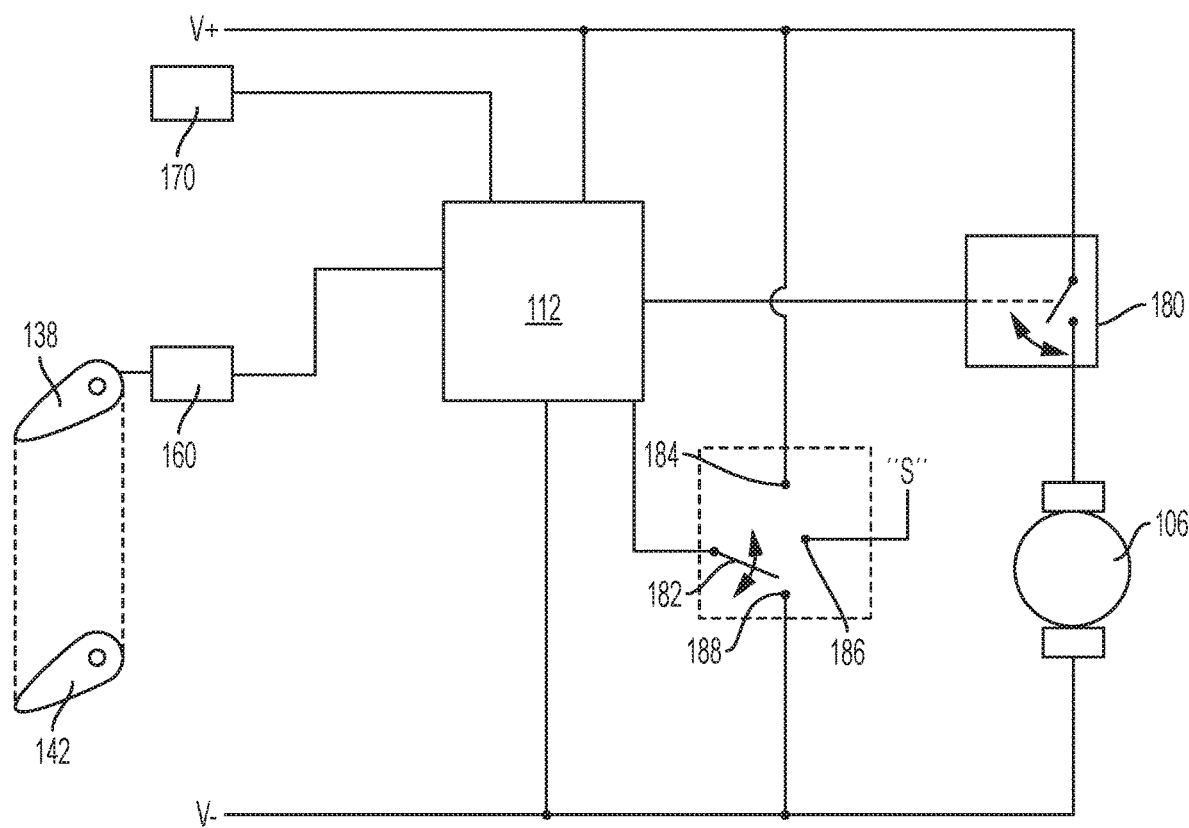
FIG. 3 shows a schematic diagram of the electronic circuit of the dust extractor of FIG. 2.

Referring to FIG. 2, the dust extractor comprises a main housing 22 which connects at its rear 118 to the motor housing 12 of a hammer drill. The mechanism by which the dust extractor connects to the hammer drill does not form art of the invention and therefore is not described. The main housing forms a first chamber 104. An electric motor 106 is mounted inside of the first chamber 104. The electric motor 106 comprise an output shaft 108 on which is mounted a fan 110. The fan 110 is an axial fan 110 whereby air is blown in a direction parallel to the axis of rotation of the fan 110. When the motor 106 is activated, the fan 110 rotates, blowing air inside of the first chamber 104 in the direction of Arrows E from a top end 114 of the first chamber 104 to a bottom end 116 of the first chamber 104. As the air flows through the first chamber 104, it cools the motor 106. An electrical controller 112 is mounted on a wall of the main housing 22 in the first chamber 104.

The top end 114 of the first chamber 104 connects to ambient air 122 surrounding the dust extractor via a first passageway 120. The bottom end 116 of the first chamber 104 connects to ambient air 122 surrounding the dust extractor via a second passageway 124.

The main housing 22 also forms a second chamber 126.

The top end 114 of the first chamber 104 connects to a top end 128 of the second chamber 126 via a third passageway 130. The third passageway 130 enters the top end 114 of the first chamber 104 at a position adjacent the position where the first passageway 120 enters the top end 114 of the first chamber 104.

The bottom end 116 of the first chamber 104 connects to a bottom end 132 of the second chamber 126 via a fourth passageway 134. The fourth passageway 134 enters the bottom end 116 of the first chamber at a position adjacent the position where the second passageway 124 enters the bottom end 116 of the first chamber 104.

Mounted on a wall 136 in the top end 114 of the first chamber 104 is a first pivotal flap 138. The first pivotal flap 138 can pivot between two positions, a first position (shown in solid lines) where it seals the entrance to the first passageway 120 and the entrance to the third passageway 130 is open and a second position (shown in dashed lines) where it seals the entrance to the third passageway 130 and the entrance to the first passageway 120 is open.

Mounted on a wall 140 in the bottom end 116 of the first chamber 104 is a second pivotal flap 142. The second pivotal flap 142 can pivot between two positions, a first position (shown in solid lines) where it seals the entrance to the fourth passageway 134 and the entrance to the second passageway 124 is open and a second position (shown in dashed lines) where it seals the entrance to the second passageway 124 and the entrance to the fourth passageway 134 is open.

The first and second pivotal flaps 138, 142 are mechanically connected to each other so that pivotal movement of one of the flaps 138, 142 results in pivotal movement of the other flap. The mechanical connection between the flaps 138, 142 ensures that when the first pivotal flap 138 is in its first position, the second pivotal flap 142 is in its first position and when the either of the flaps is moved to its second position, the other flap also moves to its second position. As such, both flaps 138, 142 move between and into their first and second positions in unison. A solenoid 160 mounted in the first chamber 104 moves the flaps 138, 142 between and holds them in their first and second positions.

An aperture 146 is formed in a wall 144 of the second chamber 126. Releasably mounted on the wall 144 of the main housing 22 is a filter 102. The filter 102 comprises pleated filter paper 148 attached to a rubber seal 150. When the filter 102 is releasably mounted on the wall 144, the seal 150 surrounds the aperture 146. The seal 150 ensures that any air which passes through the aperture 146 from the dust collection chamber 162 inside of the dust collection box 36 into the second chamber 126 must pass through the pleated filter paper 148 of the filter 102.

During the normal operation of the dust extractor, which is mounted on a hammer drill, the shroud 32 is placed against a work piece and a cutting tool driven by the hammer drill, is passed through the shroud. The motor 106 of the dust extractor is activated.

During the normal operation, the flaps 138, 142 are held in their first positions by the solenoid 160. The activated motor 106 causes the fan 110 to rotate, blowing air in the direction of Arrow E. As the flaps 138, 142 are in their first positions, the air inside of the first chamber 104 is blown out of the first chamber 104 and through the second passageway 124 and then expelled from the dust extractor into the ambient air 122. As the air is expelled from the first chamber 104, air is sucked into the first chamber 104 from the second chamber 126 via the third passageway 130 to replenish the air being expelled. Air is sucked into the second chamber 126, to replenish air sucked into the first chamber 104, from the dust collection chamber 162 through the filter 102 and then the aperture 146. As the air passes through the filter 102, any dust or debris entrained in the air is prevented from passing through the filter 102 and therefore gets stopped at and is retained by the pleats 148 of the filter 102. The air in the dust collection chamber 162 is replenished by sucking air from the shroud 32, through the tubular support 34, through the telescopic extension arm 28, 30 and into the dust collection chamber 162. The cutting tool cutting the work piece generates dust and debris which enters the shroud. The dust and debris is then entrained in the air flow as is sucked from the shroud 132, through the tubular support 34, through the telescopic extension arm 28, 30 and into the dust collection chamber 162, by the fan, where is prevented from exiting the dust collection chamber 162 by the filter. As such, the dust and debris is collected in the dust collection box 26.

As the dust extractor is used in its normal operation over a period of time, the pleats 148 of the 102 filter becomes clogged with the dust and debris and therefore the performance of the filter deteriorates. Therefor the dust extractor uses back flush to clean the filter.

When the backflush is activated, the solenoid 160 moves the flaps 138, 142 from their first positions to their second positions. The motor 106 remain activated whilst backflush takes place.

The activated motor 106 causes the fan 110 to rotate, blowing air in the direction of Arrow E (the same direction as during normal operation). As the flaps 138, 142 are now in their second positions, the air inside of the first chamber 104 is blown out of the first chamber 104 and through the fourth passageway 134 into the second chamber 126. As the air is expelled from the first chamber 104, air is sucked into the first chamber 104 from the ambient air 122 via the first passageway 120 to replenish the air being expelled. Air blown into the second chamber 126 then passes through the aperture 146, through the filter 102 and then into the dust collection chamber 162. As the air passes through the filter 102 in the reverse direction, any dust or debris retained by the pleats 148 of the filter 102 is blown of the pleats and into the dust collection chamber 162 resulting the pleats being cleaned. The excess air pressure in the dust collection chamber is released from the dust collection chamber via the telescopic extension arm 28, 30, tubular support 34 and shroud 32.

The activation of the flush back and the motor 106 are controlled by the controller 112.

The motor 106 is activated using an electronic switch 180. The switch 180 can be any well-known type of device such as relay, a transistor, a thyristor, a triac etc. The operation of the switch 180 is controlled by the controller 112. An operator can manually set the dust extractor to three different operational settings using a manual switch 182 which is connected to the controller. When the manual switch 182 is in the first position 184, the dust extractor is permanently switched on with the controller 112 ensuring the motor 106 runs continuously. When the manual switch 182 is in the second position 186, the controller 112 is connected to the control electronics of the hammer dill. When the dust extractor is in this setting, the control electronics of the hammer drill can send a signal "S" to the controller 112 when the hammer drill is switched on. The controller 112 can then activate the dust extractor based on this signal. For example, the controller 112 can activate the motor 106 when the hammer drill is switched on and de-activate the motor 106 when the hammer drill is switched off. Alternatively, the controller 112 can activate the motor 106 when the hammer drill is switched on and de-activate the motor 106 after a pre-determine time period has elapsed after the hammer drill is switched off. When the manual switch 182 is in the third position 188, the dust extractor is permanently switched off.

The activation of the back flush can implemented in a number of ways.

Firstly, the backflush can be activated using a timer which is implemented within the controller 112. After a first pre-set period of time of normal use of the dust extractor, the controller 112 activates the backflush by moving the flaps 138, 142 using the solenoid 160 to their second positions and maintaining them in their second positions for a second pre-set second period of time (which is considerably shorter than the first pre-set period of time) before moving the flaps 18, 140 back to their first positions. This process is then repeated.

Secondly, the back flush could be activated manually by the operator. A button (not shown) could be located on the side of the dust extractor. When the button is depressed by the operator, a signal is sent to the controller 112 which then activates the backflush by moving the flaps 138, 142 using the solenoid 160 to their second positions and maintains them in their second positions. When the button is released, the controller 112 moves the flaps 138, 142 using the solenoid 160 back to their first positions and maintains them in their second positions.

Thirdly, the back flush could be activated by a sensor 170 which sends a signal when the shroud 32 of the dust extractor disengages from a work piece.

Referring to FIG. 2, formed on the inside of the second section 30 of the telescopic extension arm is a groove 172. Mounted in the groove 172 at the front end the groove 172 is the sensor 170. The sensor 170 is in the form of a micro switch. However, it will be appreciated that any suitable type of sensor could be used. Formed on the outside wall of the first section 28 is a peg 174. The peg 174 extends into the groove 172. The peg 174 slides along the groove 172 as the first section 28 slides in and out of the second section 30. The amount by which the first section 28 can slide in and out of the second section 30 is limited by the amount of sliding movement of the peg 174 within the groove 172, the peg 174 preventing the first section 28 from being ejected from the second section 30 by the spring 100. When the spring 100 biases the first section 28 out of the second section 30 to outermost position, the peg 174 engages the sensor 170. When the peg 174 is in engagement with the sensor 170, the sensor 170 sends a signal to the controller 112, indicating that the first section 28 is fully extended out of the second section 30.

When the dust extractor is in use, the shroud 32 abuts against the surface of the work piece. As the hammer drill cuts into the work piece, the cutting tool enters the work piece whilst the shroud 32 remains engaged with the surface of the work piece. This relative movement is accommodated by the first section 28 of the telescopic extension arm sliding inside of the second section 30 against the biasing force of the spring 100. As the first section 28 slides inside of the second extension 30, the peg 174 slides along the groove 172 towards the rear of the dust extractor. As it slides along the groove 172, the peg 174 is disconnected from the sensor 170. When the operator ceases to work on the work piece, the operator moves the hammer drill with the dust extractor away from the work piece. When the shroud 32 disengages with the surface of the work piece, the first section 28 extends to its furthest position out of the second section 30 due to the biasing force of the spring 100, the peg 174 travelling forward along the groove 172 towards and into engagement with the sensor 170. When the peg 174 engages with the sensor 170, the sensor 170 sends a sign to the controller 112 indicating that the first section 28 is extended to its furthest position out of the second section 30 which is indicative of the shroud 32 being disengaged from the work piece.

The controller 112 can use the signal from sensor 170 to activate flush back in a number of different ways.

Firstly, it could simply activate flush back when it receives a signal from the sensor 170 and the motor 106 is activated.

Secondly, it could activate flush back when motor 106 is activated and, it first receives no signal from the sensor 170 indicating the dust extractor is in use and then subsequently receives a signal from the sensor 170 indicating the shroud 32 is disengaged from the a work piece. The flush back could then be activated for a pre-set period of time.

Thirdly, the controller 112 could use the signal from the sensor 170 in combination with other signals to determine when and/or how long to perform flush back.

Figure 4:
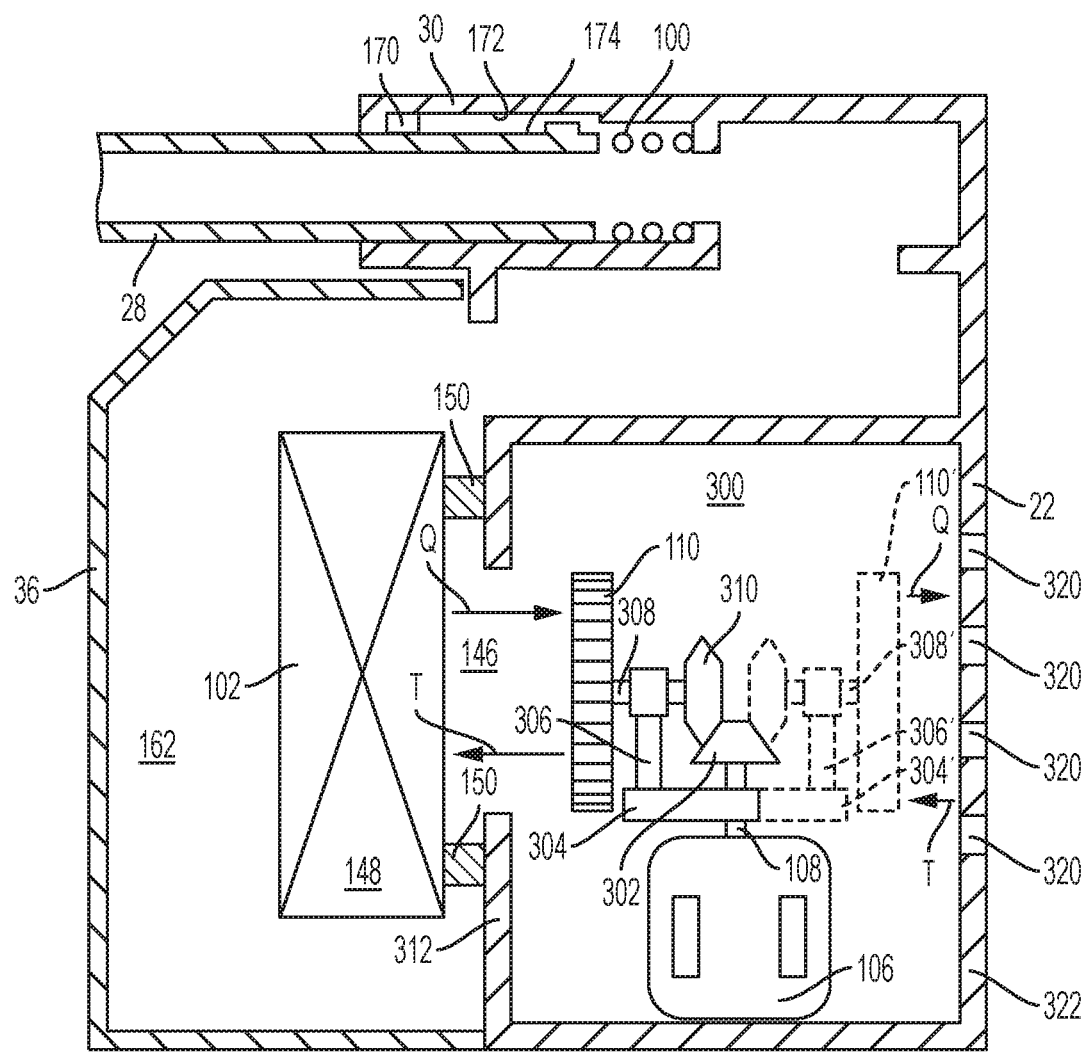
FIG. 4 shows a schematic diagram of a cross section of a dust extractor according to a second embodiment of the present invention.

A second embodiment of the present invention will now be described with reference to FIG. 4. Where the same features are present in the second embodiment are also present in the first embodiment, the same reference numbers have been used. The main difference between the first embodiment and the second embodiment is that instead of redirecting the air flow using valves in the form of flaps 138, 142 to perform flush back, the air is redirected by changing the orientation of the fan 110.

The housing 22 of the dust extractor forms a main chamber 300 in which is located a motor 106 having an output shaft 108. Mounted on the end of the output shaft 108 is a first bevel gear 302. Mounted on the output shaft 108 between the first bevel gear 302 and the motor 106 is a first end of a first rod 304, the first rod 304 extending perpendicularly away from the output shaft 108. The first rod 304 is axially fixed on the output shaft 108 but can freely rotate around output shaft 108. A first end of a second rod 306 is rigidly attached to the second end of the first rod 304, the second rod 306 extending perpendicularly to the first rod 304 but parallel to the output shaft 108. A fan shaft 308 is rotatably mounted on the second end of the second rod 306. Rigidly mounted on one end of the fan shaft 308 is a second bevel gear 310. The second bevel gear 310 is meshed with the first bevel gear 302 so that rotation of the first bevel gear 302 results in rotation of the second bevel gear 310. A fan 110 is rigidly mounted on the other end of the fan shaft 308.

When the motor 106 is activated, the output shaft 108 rotates, which in turn rotates the first and second bevel gears 302, 310, the fan shaft 308 and the fan 110.

The first rod 304 can pivot between a first position (shown in solid lines), where the fan 110 is located between an aperture 146 in the wall 312 of the main chamber 300 and the motor 106, and a second position (shown by dashed lines) where the fan 110 is located in chamber 300 on the side of the motor 106 which is remote from the aperture 146. The movement of the first rod 304 between its first and second positions is caused by a solenoid (not shown) mounted within the chamber 300.

When the first rod 304 is in its first position and the motor 106 is activated to rotate the fan 110, air is blown in the direction of Arrows Q. This results in the normal operation of the dust extractor.

Air is expelled from main chamber 300 through apertures 320 formed through the wall 322 of the rear of the main chamber 300. As the air is expelled, more air is sucked into the main chamber 300 to replenish it from the dust collection chamber 162 through the filter 102 and then the aperture 146. As the air passes through the filter 102, any dust or debris entrained in the air is prevented from passing through the filter 102 and therefore gets stopped at and is retained by the pleats 148 of the filter 102. The dust and debris is collected in the dust collection box 26. The air in the dust collection chamber 162 is replenished by sucking air from the shroud 32, through the tubular support 34, through the telescopic extension arm 28, 30 and into the dust collection chamber 162.

When the first rod 304 is in its second position (having been moved by the solenoid) and the motor 106 is activated to rotate the fan 110, air is blown in the direction of Arrows T. This results in flushback where air is blown back in the reverse direction through the filter 102. As the air passes through the filter 102 in the reverse direction, any dust or debris retained by the pleats 148 of the filter 102 is blown of the pleats and into the dust collection chamber 162 resulting the pleats being cleaned. The excess air pressure in the dust collection chamber is released from the dust collection chamber via the telescopic extension arm 28, 30, tubular support 34 and shroud 32.

The control signals for the solenoid and the motor are provided by a controller (not shown) mounted in the main chamber 300. The activation of the flush back and the motor 106 are controlled by the controller in the same manner as the controller 112 in the first embodiment controls the flush back and motor of the first embodiment.

It will be appreciated by the reader that, as an alternative design, it could be arranged that the motor 106 could rotated through 180 degrees together with the fan 110. This would allow the orientation of the motor 106 relative to the fan 110 to be altered.

Figure 5:
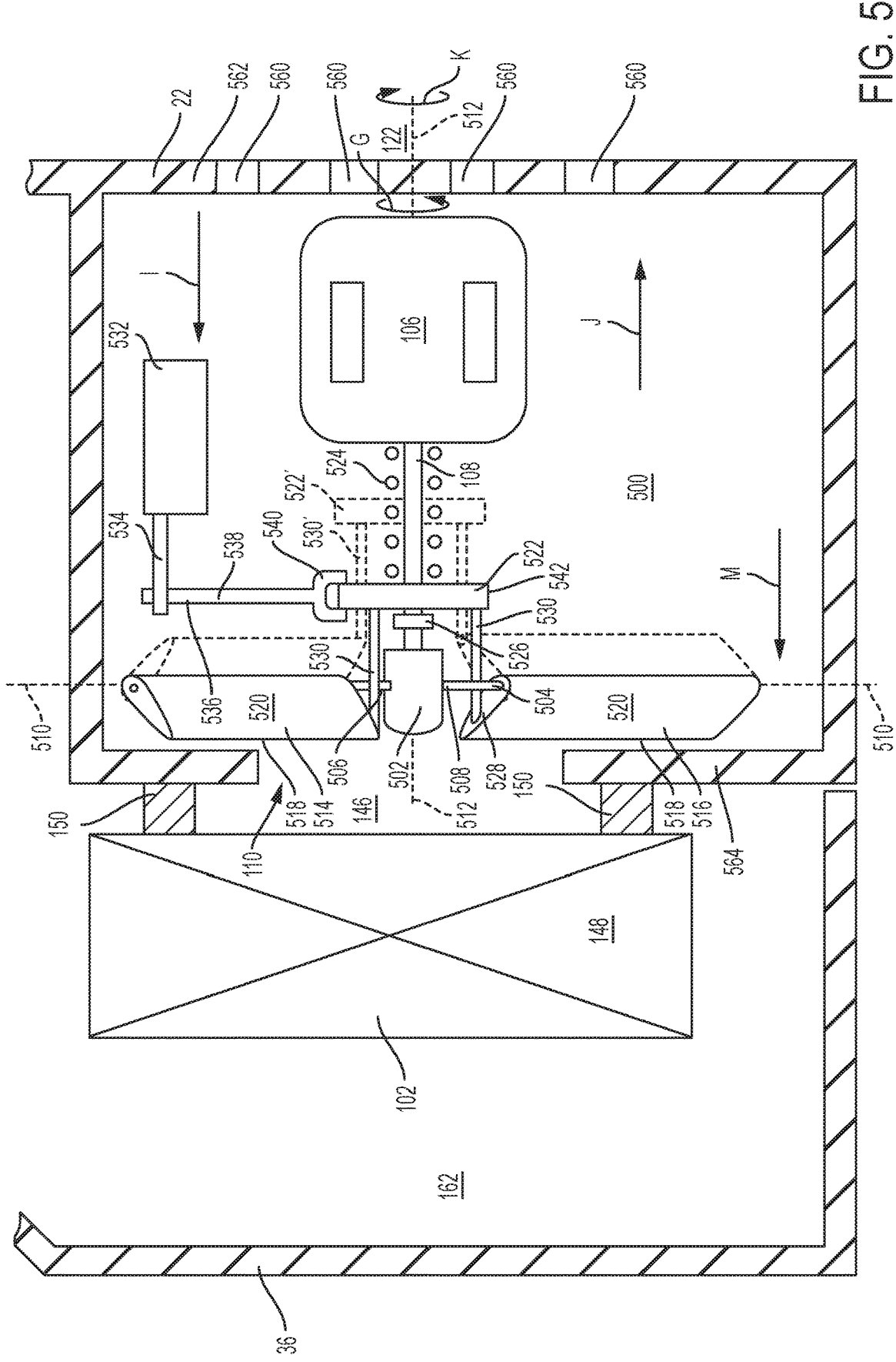
FIG. 5 shows a schematic diagram of a cross section of a dust extractor according to a third embodiment of the present invention.

A third embodiment of the present invention will now be described with reference to FIG. 5. Where the same features are present in the third embodiment are also present in the first embodiment, the same reference number has been used.

The dust extractor in the third embodiment comprises a main chamber 500 formed by walls 562, 564 of the housing 22. Mounted in the motor chamber 500 is an electric motor 106 having a drive shaft 108. Mounted in a rigid manner on the end of the drive shaft 108 is a hub 502. A straight support rod 504 of circular cross section passes through the hub 502 in a direction perpendicular to the drive shaft 108, the longitudinal axis 510 of the support rod 504 intersecting the longitudinal axis 512 of the drive shaft 108. The two ends 506, 508 of the support rod 504 extend radially away from the hub 502, in opposite directions to each other, in a symmetrical manner, the length of each of the ends 506, 508 of the rod 504 on each side of the hub 502 being equal. The support rod 504 is rigidly attached to the hub 502 and is prevented from making any axial or rotational movement relative to the hub 502.

Mounted on each end 506, 508 of the support rod 504, in a symmetrical manner, is a propeller blade 514, 516. Each propeller blade 514, 516 has a tear drop shaped cross section along it length. The support rod 504 passes through each propeller blade 514, 516 with the support rod 504 being located in the wider end of the tear drop cross section. Each propeller blade 514, 516 can pivot between a first position (shown in solid lines) and a second position (shown in dashed lines) on the support rod 504 around its longitudinal axis 510.

When the propeller blades 514, 516 are in their first position, the leading edges 518, which is the apex of the thin end of the tear drop cross section, are located further away (in the direction of Arrow M) from the electric motor 106 than the support rod 504. As such, the sides 520 of the propeller blades 514, 516 extend from the support rod 504, away from the motor 106 at an angle relative to the longitudinal axis 512 of the drive shaft 108.

When the propeller blades are in their second position, the leading edges 518, which is the apex of the thin end of the tear drop cross section, are located closer (in the opposite direction to Arrow M) to the electric motor 106 than the support rod 504. As such, the sides 520 of the propeller blades 514, 516 extend from the support rod 504, towards the motor 206 at an angle relative to the longitudinal axis 512 of the drive shaft 108.

The propeller blades 514, 516 serve to form an axial fan with air being blown in a direction parallel to the axis of rotation of the blades, the direction being dependent on the orientation of the blades.

Mounted on the drive shaft 108 is a circular swash plate 522. The swash plate 522 is capable of axially sliding along the drive shaft 108 between a first position (shown in solid lines) and a second position (shown in dashed lines). However, the swash plate 522 is non-rotatably mounted on the drive shaft 108 so that the swash plate 522 rotates in unison with the drive shaft 108. A helical spring 524, which surrounds the drive shaft 108, is sandwiched between the motor 106 and the swash plate 522, and which biases the swash plate 522 away from the motor 106 towards a stop 526 mounted on the drive shaft 108.

Pivotally attached to an inner end 528 of each propeller blade 514, 516, adjacent the leading edge 518, is an end of a strut 530. The other end of the two struts 530 are pivotally attached, in a symmetrical manner on opposite sides of the longitudinal axis 512 of the drive shaft 108, to the swash plate 522. The sliding movement of the swash plate 522 on the drive shaft 108 between its first and second positions results in the propeller blades 514, 516 pivoting on the support rod 504 between their first and second positions.

Mounted on the wall of the chamber 500 is a solenoid 532. The solenoid 532 has an activation arm 534 which is capable of axially sliding in and out of the solenoid 532. Attached to the end of the activation arm 534 is a claw 536 which extends perpendicularly to the activation arm 532. Axial movement of the activation arm 534 results in a sideways sliding movement of the claw 536. The claw 536 has an elongate shaft 538 and a C shaped grip 540. The edge 542 of the swash plate 522 locates inside of the C shaped grip 540. The C shaped grip 540 allows the swash plate 522 to freely rotate, the edge 542 freely passing through the C shaped grip 540 as it does so. However, any sideways sliding movement of the C shaped grip 540 results in the swash plate 522 being axially slid along the drive shaft 108.

When the solenoid 532 is activated, the activation arm 534 is retracted into the solenoid 532, sliding the claw 540 sideway towards the motor 106. The movement of the claw 536 towards the motor 106 results in the swash plate 522 moving towards its second position closer to the motor 106 against the biasing force of the spring 524.

When the solenoid 532 is deactivated, the activation arm 534 extends from the solenoid 532 due to the biasing force of the spring 524, sliding the claw 540 sideway away from the motor 106. The movement of the claw 536 away from the motor 106 results in the swash plate 522 moving towards its first position away from the motor 106.

When the dust extractor runs in is normal mode of operation, the solenoid 532 is switched off and the propeller blades 514, 516 are located in their first position. The motor 106 is activated and the drive shaft 108 and the propeller blades 514, 516 rotate in the direction of Arrow K. As the propeller blades 514, 516 rotate, they blow the air in the direction of Arrow J, drawing air from the dust collection chamber 162, through the filter 102 and the aperture 146 in the wall 564 of the main chamber 500, into and through the main chamber 500 and then expels it through the apertures 560 formed in a rear wall of the main chamber 500.

When flushback is activated, the solenoid 532 is switched on, causing the activation arm 534 to be retracted into the solenoid 532. This moves the claw 536 towards the motor 106, which in turn moves the swash plate 522 towards the motor 106 against the biasing force of the spring 524. This causes the propeller blades 514, 516 to move from their first position to their second position. The motor 106 is activated and the drive shaft 108 and the propeller blades 514, 516 continue to rotate in the direction of Arrow G. As the propeller blades 514, 516 rotate, they blow the air in the direction of Arrow I, in the opposite direction due to the altered pitch of the propeller blades 514, 516. This draws air from the ambient air 122 through the apertures 560 formed in a rear wall of the main chamber 500 and into the main chamber 500. The air is then blown through the aperture 146 in the wall 564 of the main chamber 500 and then through the filter 102 in the reverse direction and then into the dust collection chamber 162. As the air passes through the filter 102 in the reverse direction, it blows the dust and debris from the pleats 148 of the filter 102 and into the dust collection chamber 162.

When flush back is deactivated, the solenoid 532 is switched off, causing the activation arm 534, the claw 536 and the swash plate 522 to move away from the motor 106 due to the biasing force of the spring 524. This moves the propeller blades 514, 516 back to their first positions.

The control signals for the solenoid 532 and the motor 106 are provided by a controller (not shown) mounted in the main chamber 300. The activation of the flush back and the motor 106 are controlled by the controller in the same manner as the controller 112 in the first embodiment controls the flush back and motor of the first embodiment.

A fourth embodiment of the present invention will now be described with reference to FIGS. 6 to 13. Where the same features are present in the fourth embodiment are also present in the first embodiment, the same reference numbers have been used. The main difference between the first embodiment and the fourth embodiment is that instead of having a valve assembly using flaps 138, 142 for redirecting the air flow to perform flush back, the valve assembly comprises a rotational circular cover 700 mounted within a circular housing 702.

Figure 6:
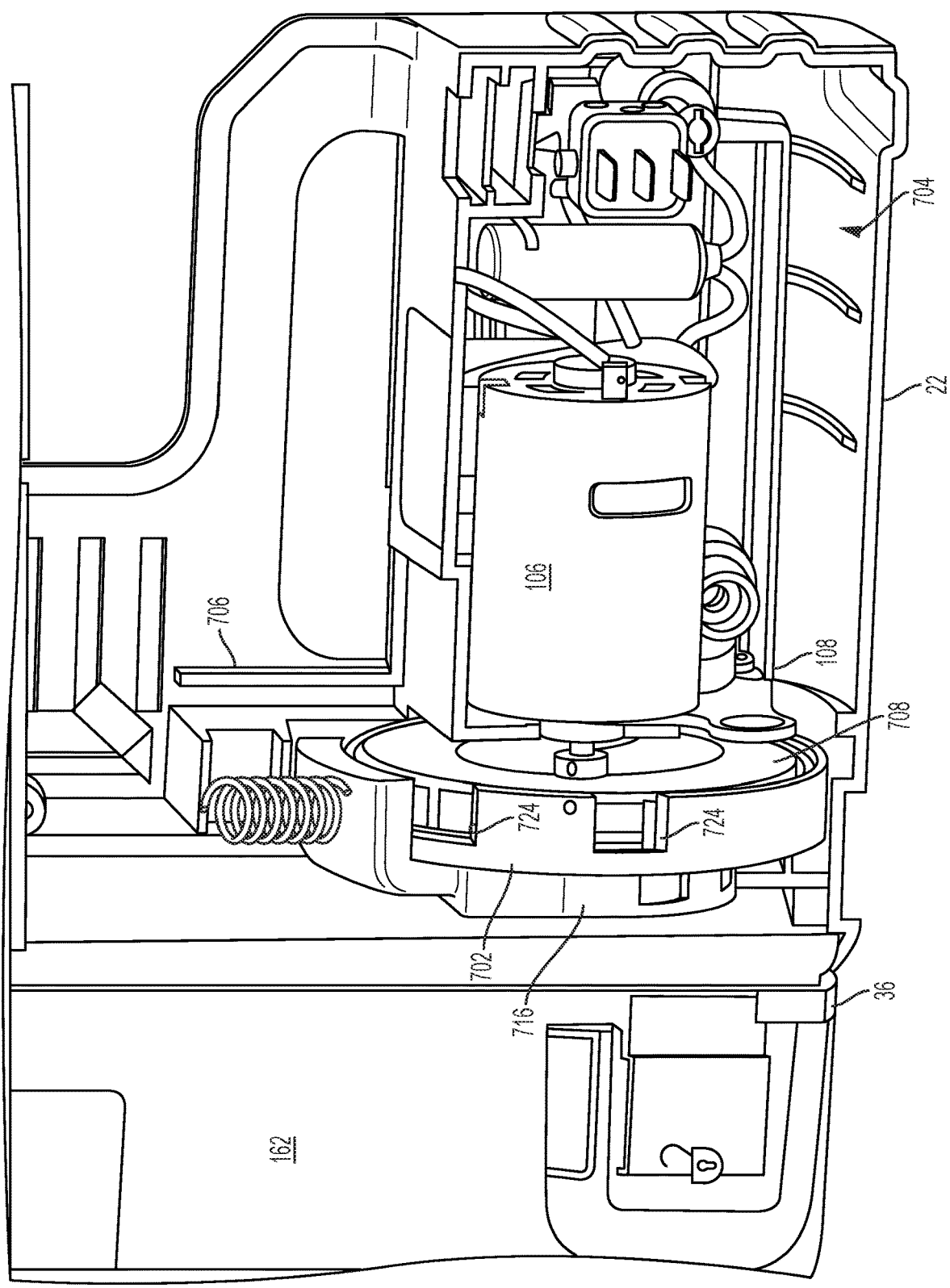
FIG. 6 shows a diagram of a cross section of a dust extractor according to a fourth embodiment of the present invention.

Referring to FIG. 6, an electric motor 106 is mounted in a chamber 704 formed in the housing 22 of a dust extractor. A drive spindle 108 extends from the motor 106 towards an aperture 146 formed in a wall 706 of the chamber 704. A fan 708 is rigidly mounted on the drive spindle 108. The fan 708 is a radial fan which results in the air being blown radially away from the fan 708 in a direction perpendicularly to the axis of rotation of the fan 708.

Figure 7:
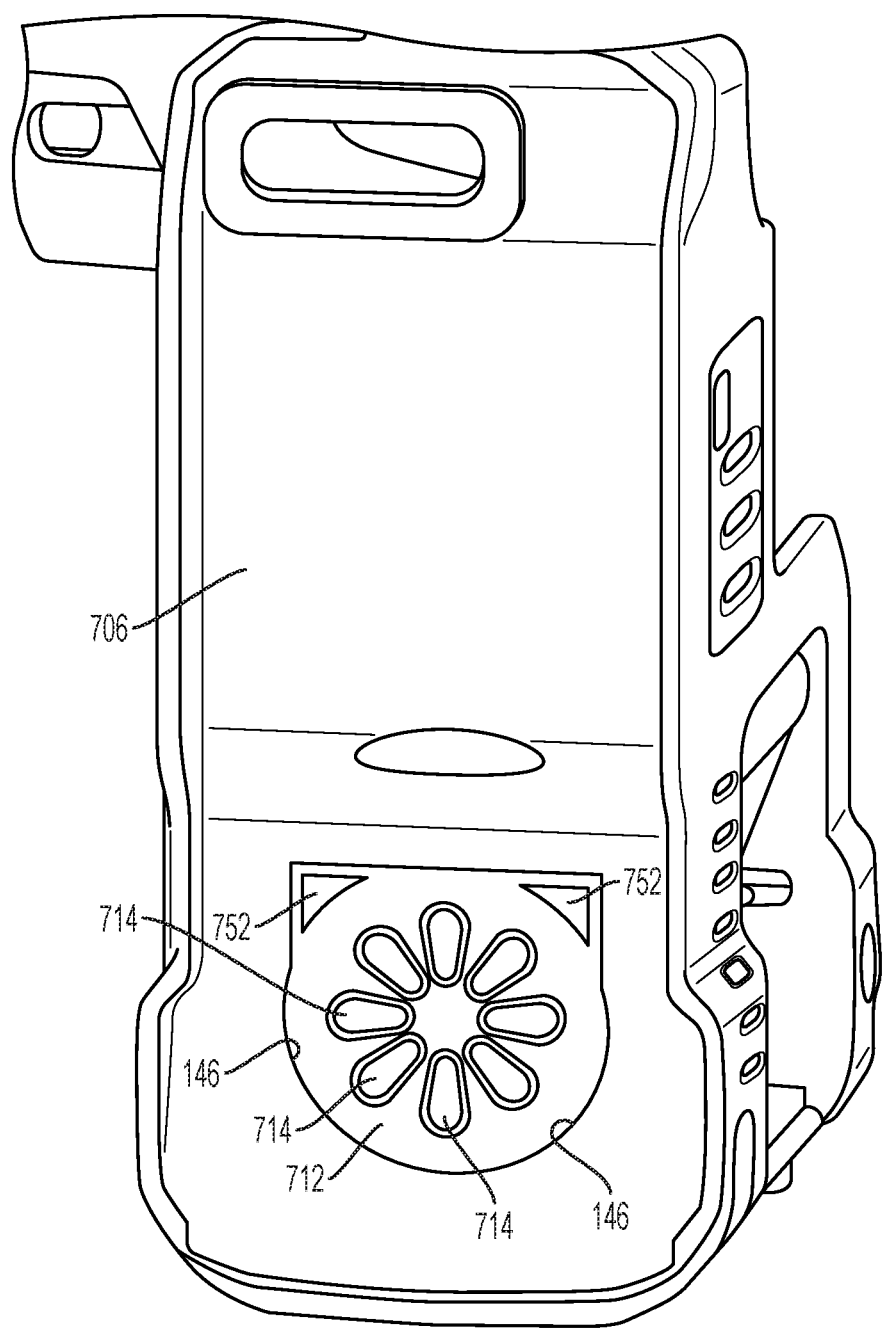
FIG. 7 shows an end view of the main housing of the fourth embodiment with the dust collection box removed.

Mounted on the wall 706 of the chamber 704 is the circular housing 702 (see FIGS. 6 and 7). The circular housing 702 has on its front end a raised section 712 with eight apertures 714 formed through the raised section 712 (see FIGS. 8 and 9). The apertures 714 are located in a symmetrical fashion in a circular pattern. The shape of the edge of the aperture 146 in the wall 706 of the chamber 704 corresponds to the shape of the periphery 716 of the raised section 712 so that the raised section 712 locates inside of and passes through the aperture 146, with the apertures 714 facing towards the downstream side of the filter (not shown) in the dust collection box 36. The raised section 712 is used to rigidly mount the circular housing 702 on the wall of the chamber 704. The fit between the shape of the edge of the aperture 146 in the wall 706 of the chamber 704 and the shape of the periphery 716 of the raised section 712 is such that no air is able pass between the edge of the aperture 146 in the wall 706 of the chamber 704 and the periphery 716 of the raised section 712.

Figure 9:
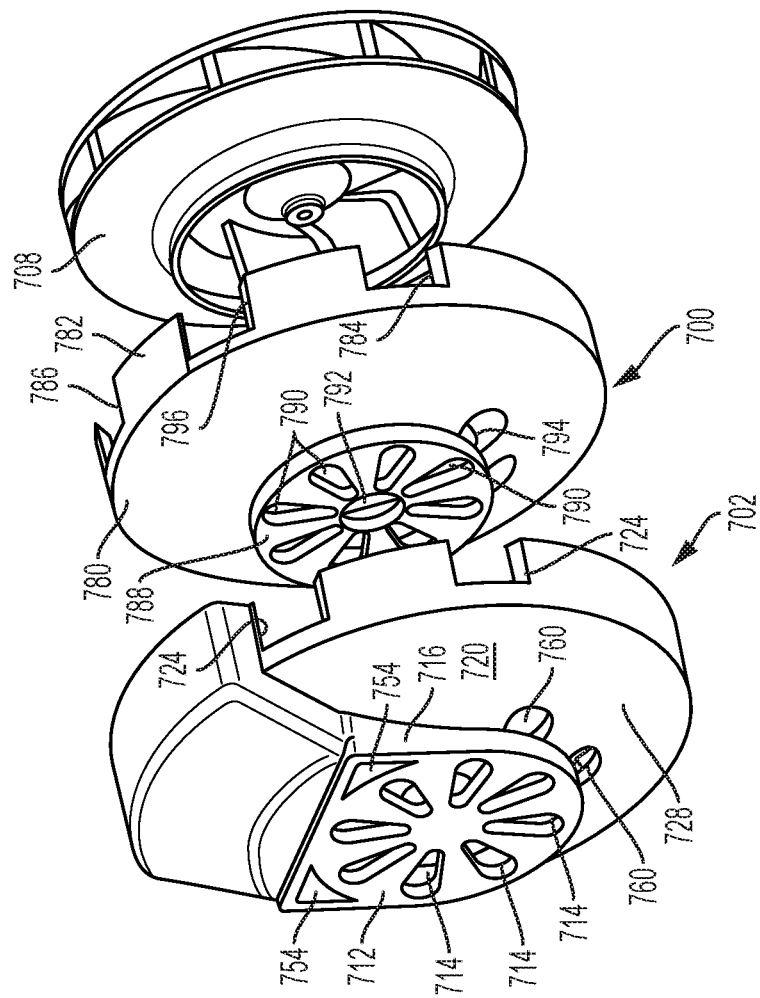
FIG. 9 shows an exploded perspective view of the valve assembly of the fourth embodiment.
Figure 8:
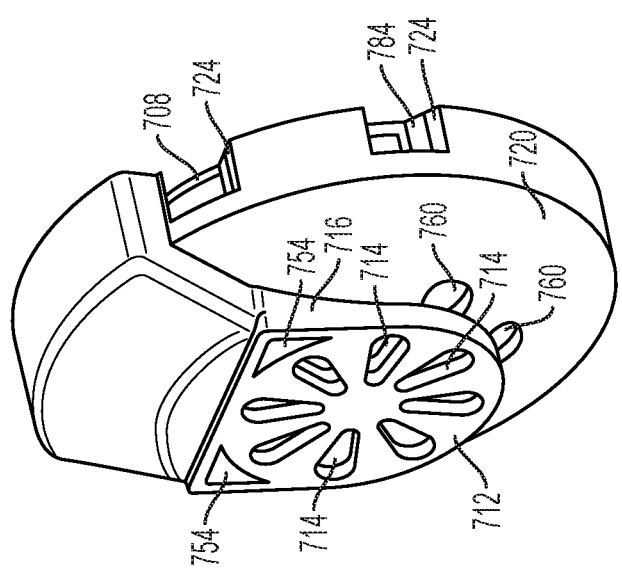
FIG. 8 shows a perspective view of the valve assembly of the fourth embodiment.
Figure 11:
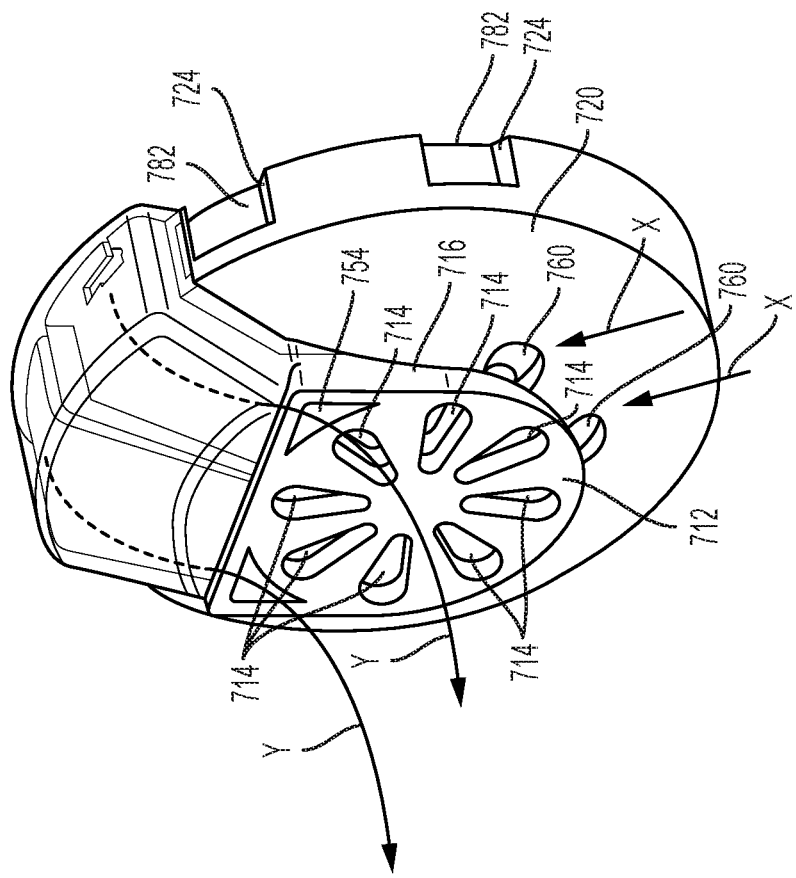
FIG. 11 shows a perspective view of the valve assembly of the fourth embodiment with the valve set so that the dust extractor is in flush back and air is blown in the reverse direction through the filter.
Figure 10:
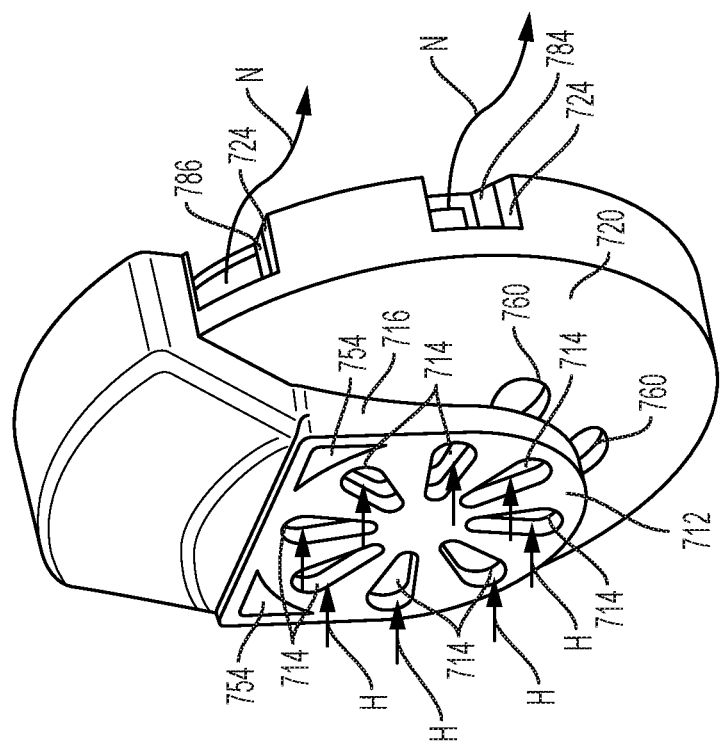
FIG. 10 shows a perspective view of the valve assembly of the fourth embodiment with the valve set so that air is drawn through the filter.
Figure 13:
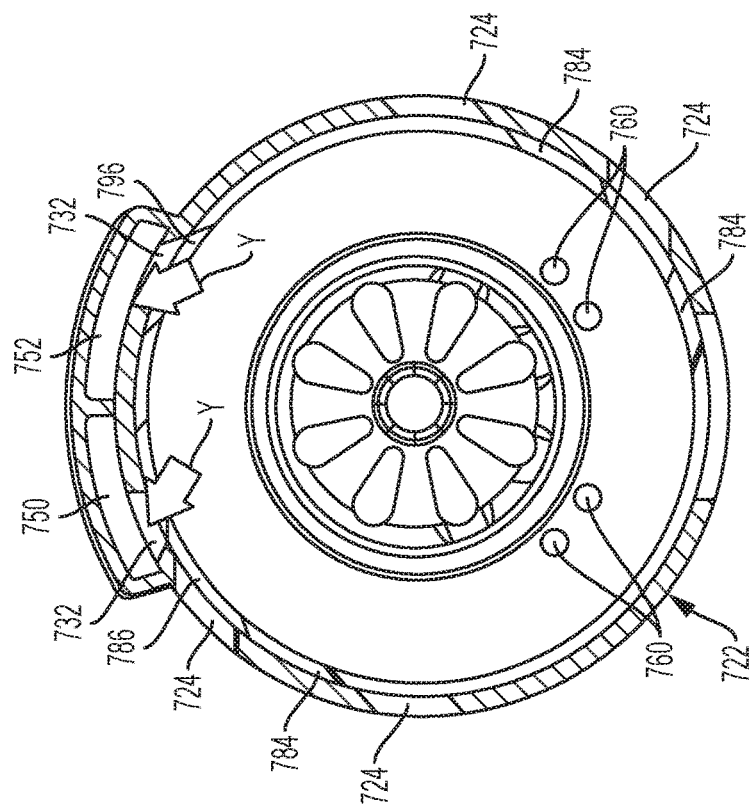
FIG. 13 shows a rear view of the valve assembly of the fourth embodiment with the valve set so that the dust extractor is in flush back and air is blown in the reverse direction through the filter.
Figure 12:
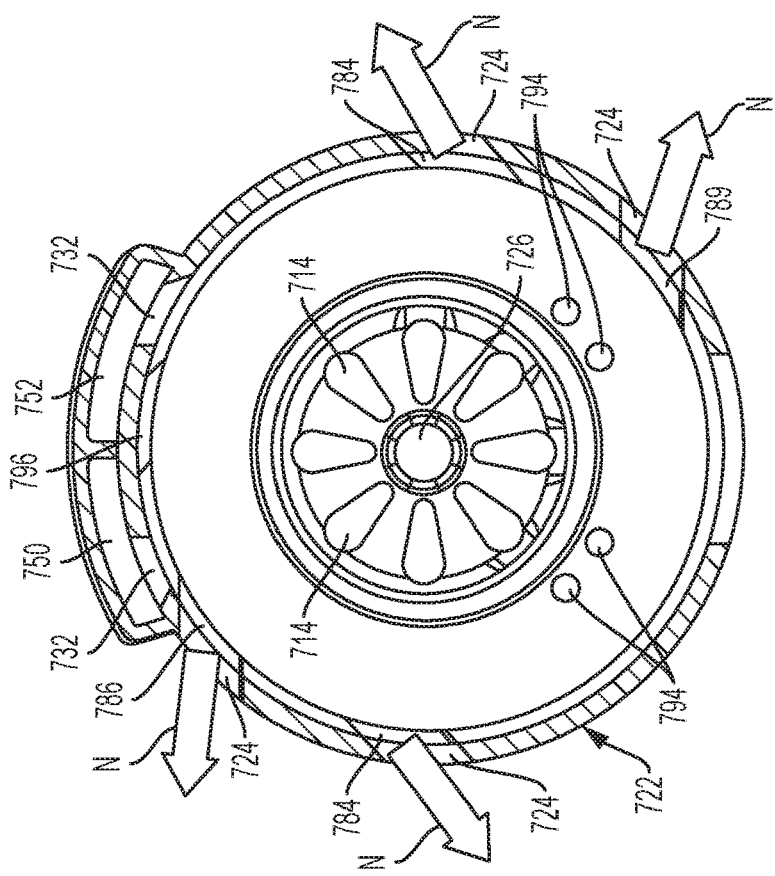
FIG. 12 shows a rear view of the valve assembly of the fourth embodiment with the valve set so that air is drawn through the filter.

The housing 702 comprises a skirt 720 (see FIGS. 8 and 9). The skirt 720 surrounds the radial fan 708. The end of the drive spindle 108 locates in a pocket 726 formed on the inside of the circular housing 702 (see FIG. 12). The skirt 720 comprises a skirt periphery 722 in which are formed six gaps 724, 732 through which air can pass. Four of the gaps 724 allow air to pass between the space inside of the skirt 720 (in which the radial fan 708 is located) and the space surrounding the skirt 720 which forms part of the chamber 704. One of the other two of the gaps 732 allows air to pass between the space inside of the skirt 720 and a space inside of one end of a first passageway 750 (see FIGS. 12 and 13). The other of the two gaps 732 allows air to pass between the space inside of the skirt 720 and a space inside of one end of a second passageway 752. The two passageways 750, 752 extend in parallel from the top of the shirt periphery 722 to the periphery 716 of the raised section 712. Each passageway 750, 752 connects between one of the gaps 732 in the skirt periphery 722 to an expulsion aperture 754 formed in the raised section 712 above the apertures 714.

Four holes 760 are formed through the top 728 of the skirt 720 which are located radially outwards from the apertures 714, through which air can pass between the space inside of the skirt 720 (in which the radial fan 708 is located) and the space surrounding the skirt 720 which forms part of the chamber 704.

The circular cover 700 is mounted inside of the housing 702 between the inner wall of the housing 702 and the radial fan 708. The circular cover 700 can rotate over a limited angular range of movement inside the housing 702 between two positions as described in more detail below.

The circular cover 700 comprises a skirt 780 (see FIG. 9). The skirt 780 surrounds the radial fan 708 and locates between the skirt 720 of the housing 702 and the radial fan 708. The skirt 780 comprises a skirt periphery 782 in which are formed five gaps 784, 786, 796 through which air can pass. The circular cover 700 has on its front end a circular raised section 788 with eight apertures 790 formed through the circular raised section 788 (see FIG. 9). The apertures 790 are located in a symmetrical fashion in a circular pattern in same manner as the apertures 714 in the housing 702. The circular raised section 788 locates in side of raised section 712 of the housing 702. The circular raised section 788 comprises central aperture 792 formed in the centre of the circular raised section 788 which is surrounded by the apertures 790. The end of the spindle 108 of the motor 106 passes through the central aperture 792 prior to locating into the pocket 726 formed on the inside of the circular housing 702. The circular cover 700 rotates around the end of the spindle 108.

Four holes 794 are formed through the top of the skirt 780 which are located radially outwards from the apertures 790. The position the four holes 794 correspond to the positions of the holes 760 in the housing 702.

The circular cover 700 can rotate inside the housing 702 between two positions. In its first position, the dust extractor operates in its normal mode of operation. In its second position, the dust extractor performs flush back.

In the first position (shown FIGS. 8, 10 and 12), the apertures 714 in the raised section 712 of housing 2 align with the apertures 790 of the cover 700. As such, air is able to pass from the space located on the downstream side of the filter (not shown) in the dust collection box 36 to the space inside of the housing 702 and cover 700 where the radial fan 708 is located.

In the first position, the four holes 794 of the cover 700 are off set with the holes 760 of the housing 702, the four holes 794 of the cover 700 facing the inner wall of the skirt 720 the housing 702 and the four holes 760 of the housing 702 facing the outer wall of the skirt 780 of the cover 700. As such, both sets four holes 760, 794 are sealed so that air cannot pass through either set of four holes 760, 794.

In the first position, four of the gaps 784, 786 in the skirt periphery 782 of the cover 700 align with the four gaps 724 in the skirt periphery 722 of the skirt 720 of the housing 702 which connect with the chamber 704. As such, air is able to pass from the space inside of the housing 702 and cover 700, where the radial fan 708 is located, to the chamber 704. The fifth gap 796 of the skirt periphery 782 of the cover 700 faces towards the inner wall of the skirt 720 of the housing 702 and thus is sealed with air being prevented from passing through it. The two gaps 732 in the skirt periphery 722 of the housing 702 which connect to the two passageways 750, 752 face an outer wall of the skirt 782 of the cover 700 and thus are sealed with air being prevented from passing through the. As such, air cannot pass rough either of the passageways 750.752.

When the dust extractor operates in its normal mode of operation, the radial fan 708 rotates, blowing air radially sideways. As the air is blown sideways, more air is drawn into the fan 708 from the space in front of the fan 708. As the apertures 714 in the raised section 712 of housing 2 are aligned with the apertures 790 of the cover 700, air is able to be drawn (Arrows H) from the space located downstream side of the filter (not shown) in the dust collection box 36 through the apertures 714, 790 into the space inside of the housing 702 and cover 700 where the radial fan 708 is located. As air is able to pass through the four gaps 784, 786 in the skirt periphery of the cover 700 aligned with the four gaps 724 in the skirt periphery 722 of the skirt 720 of the housing 702, air is blown (Arrows N) by the fan 708 from the space inside of the housing 702 and cover 700 where the radial fan 708 is located through the gaps 724, 784, 786 to the chamber 704. The air is then able to pass from the chamber 704 and be expelled to surrounding atmosphere. As such, air is caused to pass through the filter in the normal direction, the filter blocking any dust and preventing it from leaving the dust collection box 36.

When the dust extractor undergoes back flush, the cover 700 is rotated from its first position to its second position.

In the second position (shown FIGS. 11 and 13), the apertures 714 in the raised section 712 of housing 2 are off set with the apertures 790 of the cover 700. As such, no air is able to pass from the space located on the downstream side of the filter (not shown) in the dust collection box 36 to the space inside of the housing 702 and cover 700 where the radial fan 708 is located.

In the second position, the four holes 794 of the cover 700 are aligned with the holes 760 of the housing 702. As such, air can pass from the chamber 704 to the space inside of the housing 702 and cover 700 where the radial fan 708 is located.

In the second position, the four of the gaps 784, 786 in the skirt periphery 782 of the cover 700 are off set with the four gaps 724 in the skirt periphery 722 of the skirt 720 of the housing 702 which connect with the chamber 704. As such, air is unable to pass from the space inside of the housing 708 and cover 700 where the radial fan 708 is located to the chamber 704. However, one of the four gaps 786 in the skirt periphery 782 of the cover 700 aligns with one of the gaps 732 in the housing 702 which connects with one of the passageways 750. The fifth gap 796 of the skirt periphery 782 of the cover 700 aligns with the other one of the gaps 732 in the housing 702 which connects with the second passageway 752. A such, air can pass from the space inside of the housing 702 and cover 700 where the radial fan 708 is located through the gaps 786, 796, 732 and passageways 750, 752 to the space located on the downstream side of the filter (not shown) in the dust collection box 36.

When the dust extractor operates in back flush, the radial fan 708 rotates, blowing air radially sideways. As the air is blown sideways, more air is drawn into the fan 708 from the space in front of the fan 708. As the four holes 794 of the cover 700 are aligned with the holes 760 of the housing 702, air is drawn (Arrow X) by the fan 708 from the chamber 704 into the space inside of the housing 702 and cover 700 where the radial fan 708 is located. As two 786 796 in the skirt periphery 782 of the cover 700 are aligned with the gaps 732 in the housing 702 which connects with the passageways 750, 752, air is blown (Arrow Y) by the fan 708 from the space inside of the housing 702 and cover 700 where the radial fan 708 is located through the gaps 786, 796, 732 and passageways 750, 752 to the space located on the downstream side of the filter (not shown) in the dust collection box 36. As such air is caused to pass through the filter in the reverse direction causing any dust attached to the filter to be blown off the filter and back into the dust collection box.

The rotational movement of the cover 700 from its first position to its second position in order to perform back flush and subsequently from its second position to its first position in order for the dust extractor to operate in its normal mode of operation is controlled by a solenoid (not shown) mounted in the chamber 706 which is connected to the cover 700.

The control signals for the solenoid and the motor 106 are provided by a controller (not shown) mounted in the main chamber 300. The activation of the flush back and the motor 106 are controlled by the controller in the same manner as the controller 112 in the first embodiment controls the flush back and motor of the first embodiment.

Figure 14:
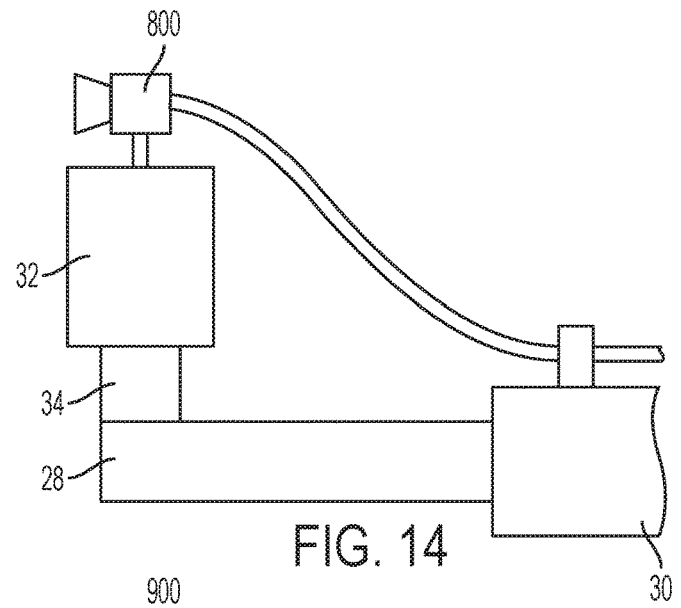
FIG. 14 shows a schematic diagram of a shroud and telescopic arm of a dust extractor according to a fifth embodiment of the present invention.

A fifth embodiment of the present invention will now be described with reference to FIG. 14. Where the same features are present in the fifth embodiment are also present in the first embodiment, the same reference numbers have been used. The only difference between the first embodiment and the fifth embodiment is that a different type of sensor is used. Instead of having a micro switch 170 which indicates that the first section 28 is fully extended out of the second section 30, an ultrasonic sensor 800 is used to indicate the distance of the shroud 32 from a work piece.

The ultra-sonic sensor 800 is mounted on the shroud 32 of the dust extractor. The ultra-sonic sensor 800 sends out a sonic signal towards the work piece and measures the strength of the reflected sound and/or the time it takes to receive the reflected sound. Based on this information, the ultrasonic sensor 800 can send a signal to the controller 112 indicating that the shroud 32 has disengaged from the work piece or is a certain distance from the work piece. The controller can then utilise this information to determine when back flush should take place. The operation of the sensor 800 could be controlled by the controller 112 or the sensor 800 could operate on its own.

Figure 15:
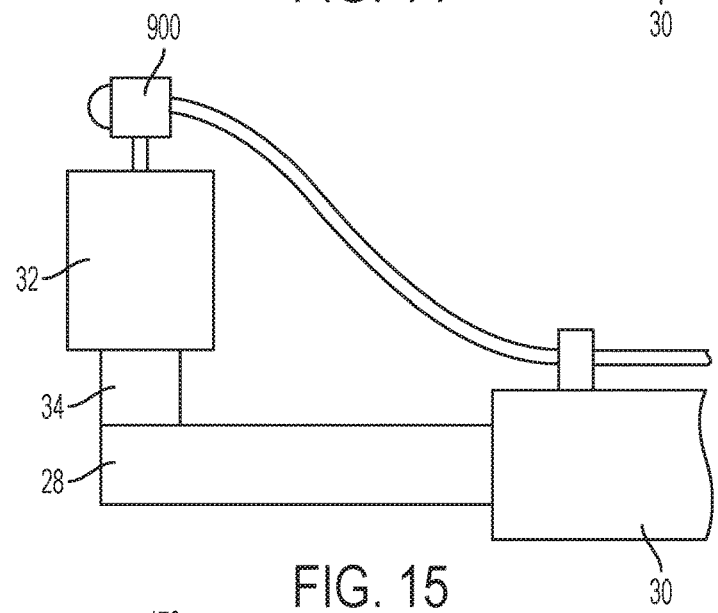
FIG. 15 shows a schematic diagram of a shroud and telescopic arm of a dust extractor according to a sixth embodiment of the present invention.

A sixth embodiment of the present invention will now be described with reference to FIG. 15. Where the same features are present in the sixth embodiment are also present in the first embodiment, the same reference numbers have been used. The only difference between the first embodiment and the sixth embodiment is that a different type of sensor is used. Instead of having a micro switch 170 which indicates that the first section 28 is fully extended out of the second section 30, a light sensor 900, such as an infra-red or laser sensor is used to indicate the distance of the shroud 32 from a work piece.

The light sensor 900 is mounted on the shroud 32 of the dust extractor. The light sensor 800 sends out a light signal towards the work piece and monitors the reflection. Based on this information, the light sensor 800 can send a signal to the controller 112 indicating that the shroud 32 has disengaged from the work piece or is a certain distance from the work piece. The controller can then utilise this information to determine when back flush should take place. The operation of the sensor 900 could be controlled by the controller 112 or the sensor 900 could operate on its own.

Alternatively, the light sensor 900 could send the controller 112 a constant steam of data about the reflection so that the controller 112 can determine whether the shroud 32 has disengaged from the work piece or is a certain distance from the work piece.

Figure 16:
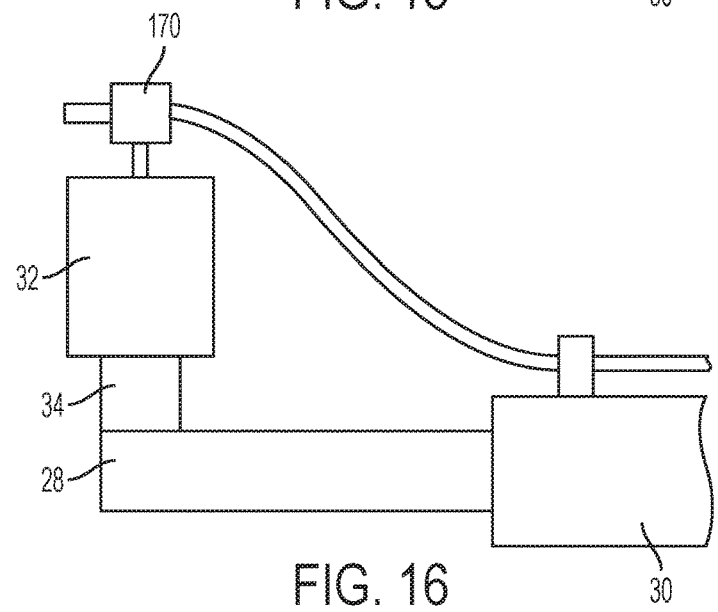
FIG. 16 shows a schematic diagram of a shroud and telescopic arm of a dust extractor according to a seventh embodiment of the present invention.

A seventh embodiment of the present invention will now be described with reference to FIG. 16. Where the same features are present in the seventh embodiment are also present in the first embodiment, the same reference numbers have been used. The only difference between the first embodiment and the seventh embodiment is that the micro switch 170 is mounted on the shroud 32 instead of the telescopic arm 28, 30 and directly engages with the work piece. When the shroud 32 is disengaged from the work piece, the micro switch 170 sends a signal to the controller 112.

It will be appreciated that instead of using a solenoid in the first embodiment to move the pivotal flaps 138, 142, or a solenoid in the second embodiment to change the orientation of the fan 110 or a solenoid in the third embodiment to pivot the blades 514, 516, or a solenoid in the fourth embodiment to rotate the cover 700, the solenoids could in any of the embodiments be omitted and a mechanical link provided which connect to the pivotal flaps 138, 142, or the fan 110 or the pivotal blades 514, 516 or the cover 700 by which an operator is able to manually move the pivotal flaps 138, 142, or the fan 110 or the pivotal blades 514, 516 or the cover 700 between their normal operating positions and their flush back positions. It will also be appreciate that other type of mechanical drives could be used instead of a solenoid such as an electric motor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A dust extractor for use with a power tool comprising:
   a housing forming a dust collection chamber and a main chamber separated from one another via an internal wall having an aperture;
   an electric fan disposed within the main chamber to generate an airflow stream through the dust collection chamber and the aperture;
   a shroud mounted to the housing in fluid communication with the dust collection chamber;
   a filter assembly located on the aperture such that the airflow stream flowing between the dust collection chamber and the main chamber passes through the filter assembly and the aperture; and
   a valve assembly disposed within the main chamber configured to change a direction of the airflow stream through the aperture,
   wherein, during a normal operation of the dust extractor, the valve assembly is configured in a first orientation to guide the airflow stream in a first direction in which the airflow stream is introduced from outside the housing and through the shroud into the dust collection chamber and includes dust particles generated by an operation of the power tool, and the filter assembly traps the dust particles as the airflow stream passes from the dust collection chamber and through the aperture into the main chamber; and
   during a backflush operation of the dust extractor, the valve assembly is configured in a second orientation to guide the airflow stream in a second direction in which the airflow stream passes from the main chamber and through the aperture and collects the dust particles trapped by the filter assembly to clean the filter assembly as it passes into the dust collection chamber.

2. The dust extractor of claim 1, wherein the filter assembly comprises a single filter or a plurality of filters located in series and/or in parallel with each other.

3. The dust extractor of claim 1, wherein the valve assembly comprises a rotary valve, the rotary valve comprising:

a circular housing; and a rotatable cover rotatably mounted between the circular housing and the fan, wherein the rotatable cover is rotatable between the first orientation and the second orientation relative to the circular housing.

4. The dust extractor of claim 3, wherein the circular housing includes a first plurality of openings and a second plurality of openings therein; the rotatable cover rotatably includes a third plurality of openings and a fourth plurality of openings therein, and wherein:

in the first orientation, the first plurality of openings is aligned with the third plurality of second openings but the second plurality of openings is not aligned with the fourth plurality of openings so the airflow stream passes in the first direction from the aperture, through the first plurality of openings and the third plurality of openings, and into the fan, and in the second orientation, the first plurality of openings is not aligned with the third plurality of second openings but the second plurality of openings is aligned with the fourth plurality of openings so the airflow stream passes from the fan, through the second plurality of openings and the fourth plurality of openings, and into the aperture in the second direction.

5. The dust extractor of claim 3, wherein the fan comprises a radial fan mounted inside the rotatable cover, and the circular housing extends circumferentially around the rotatable cover.

6. The dust extractor of claim 3, wherein the circular housing includes a raised section received into the aperture.

7. The dust extractor of claim 1, further comprising an electric motor disposed within the main chamber configured to drive the fan.

8. The dust extractor of claim 7, wherein the electric motor is located adjacent the fan across from the valve assembly.

9. The dust extractor of claim 1, wherein the valve assembly comprises a plurality of pivotal flaps configurable in the first orientation or the second orientation.

* * * * *